United States Patent
Gima

(10) Patent No.: US 12,409,710 B2
(45) Date of Patent: Sep. 9, 2025

(54) LAMINATED GLASS

(71) Applicant: AGC Inc., Tokyo (JP)

(72) Inventor: Yuhei Gima, Tokyo (JP)

(73) Assignee: AGC Inc., Tokyo (JP)

( * ) Notice: Subject to any disclaimer, the term of this patent is extended or adjusted under 35 U.S.C. 154(b) by 494 days.

(21) Appl. No.: 17/894,301

(22) Filed: Aug. 24, 2022

(65) Prior Publication Data

US 2023/0001770 A1 Jan. 5, 2023

Related U.S. Application Data

(63) Continuation of application No. PCT/JP2021/014317, filed on Apr. 2, 2021.

(30) Foreign Application Priority Data

Apr. 3, 2020 (JP) .................. 2020-067824

(51) Int. Cl.

| | |
|---|---|
| B32B 3/18 | (2006.01) |
| B32B 17/08 | (2006.01) |
| B32B 17/10 | (2006.01) |
| B32B 23/00 | (2006.01) |
| B32B 23/08 | (2006.01) |
| B32B 27/08 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/40 | (2006.01) |
| B60J 1/00 | (2006.01) |
| B60J 3/04 | (2006.01) |

(52) U.S. Cl.
CPC ............ B60J 1/001 (2013.01); B32B 3/18 (2013.01); B32B 17/08 (2013.01); B32B 17/10036 (2013.01); B32B 23/00 (2013.01); B32B 23/08 (2013.01); B32B 27/08 (2013.01); B32B 27/281 (2013.01); B32B 27/285 (2013.01); B32B 27/286 (2013.01); B32B 27/302 (2013.01); B32B 27/325 (2013.01); B32B 27/34 (2013.01); B32B 27/36 (2013.01); B32B 27/365 (2013.01); B32B 27/40 (2013.01); B60J 3/04 (2013.01); B32B 2250/40 (2013.01); B32B 2307/412 (2013.01); B32B 2307/51 (2013.01); B32B 2457/20 (2013.01); B32B 2605/006 (2013.01)

(58) Field of Classification Search
None
See application file for complete search history.

(56) References Cited

U.S. PATENT DOCUMENTS

2013/0299856 A1* 11/2013 Verger ............ B32B 17/10541
438/27

FOREIGN PATENT DOCUMENTS

| JP | 2009-036967 A | 2/2009 |
|---|---|---|
| JP | 2011-88784 A | 5/2011 |
| JP | WO 2019/221218 A1 | 4/2021 |

OTHER PUBLICATIONS

International Search Report issued Jun. 8, 2021 in PCT/JP2021/014317 filed on Apr. 2, 2021, 2 pages.

* cited by examiner

*Primary Examiner* — Sheeba Ahmed
(74) *Attorney, Agent, or Firm* — Oblon, McClelland, Maier & Neustadt, L.L.P.

(57) ABSTRACT

To provide laminated glass that can significantly reduce air bubbles remaining inside.
Laminated glass having a first glass substrate and a second glass substrate laminated to each other, which has a first interlayer disposed between the first glass substrate and the second glass substrate and being in contact with the first glass substrate, a second interlayer disposed between the first glass substrate and the second glass substrate and being in contact with the second glass substrate, first and second functional members disposed between the first interlayer and the second interlayer and being in contact with the first interlayer and the second interlayer, wherein the first and second functional members have a higher rigidity than the first and second interlayers, and the first and second functional members are spaced apart from each other by a distance d when the laminated glass is viewed in plan view, and said distance d is at least 15 mm.

20 Claims, 3 Drawing Sheets

LAMINATED GLASS

TECHNICAL FIELD

The present invention relates to laminated glass.

BACKGROUND ART

Laminated glass, which is composed of a pair of glass substrates laminated via an interlayer installed on the surface of each glass substrate, is widely used, for example, as a glass member for vehicles.

In recent years, various functional members have been sealed inside laminated glass to let the laminated glass express additional functions. For example, when a light control film is sealed between a pair of interlayers, it is possible to adjust the transmittance of the laminated glass according to the environment (e.g. Patent Document 1).

PRIOR ART DOCUMENT

Patent Document

Patent Document 1: JP-A-2009-36967

DISCLOSURE OF INVENTION

Technical Problem

When a functional member is sealed inside laminated glass, wrinkles may occur in the functional member. In particular, in a case where the glass substrate has a curved surface and the functional member has higher rigidity than the interlayers, the functional member cannot follow the curved surface of the glass substrate and wrinkles are more likely to occur.

Therefore, in order to suppress the occurrence of such wrinkles, it is conceivable to dispose functional members dividedly inside the interlayers.

However, in such a construction that a plurality of divided functional members are mutually spaced apart along the surface direction of the glass substrate, there is a high possibility that air bubbles will remain in the gaps between the functional members. If the residual air bubbles become pronounced, the adhesion between the functional members and the interlayers will decrease, and the possibility of delamination occurring at the interface between the functional members and the interlayers will increase.

The present invention has been made in view of such a background, and the present invention aims to provide laminated glass that can significantly reduce air bubbles remaining inside.

Solution to Problem

The present invention provides laminated glass, having a first glass substrate and a second glass substrate laminated to each other, which has
  a first interlayer disposed between the first glass substrate and the second glass substrate and being in contact with the first glass substrate,
  a second interlayer disposed between the first glass substrate and the second glass substrate and being in contact with the second glass substrate, and
  first and second functional members disposed between the first and second interlayers and being in contact with the first and second interlayers, wherein
  the first and second functional members have a higher rigidity than the first and second interlayers,
  the first and second functional members are spaced apart from each other by a distance d when the laminated glass is viewed in plan view, and
  the distance d is at least 15 mm.

Advantageous Effects of Invention

The present invention provides laminated glass that can significantly reduce air bubbles that remain inside.

DESCRIPTION OF EMBODIMENTS

Figure 1:
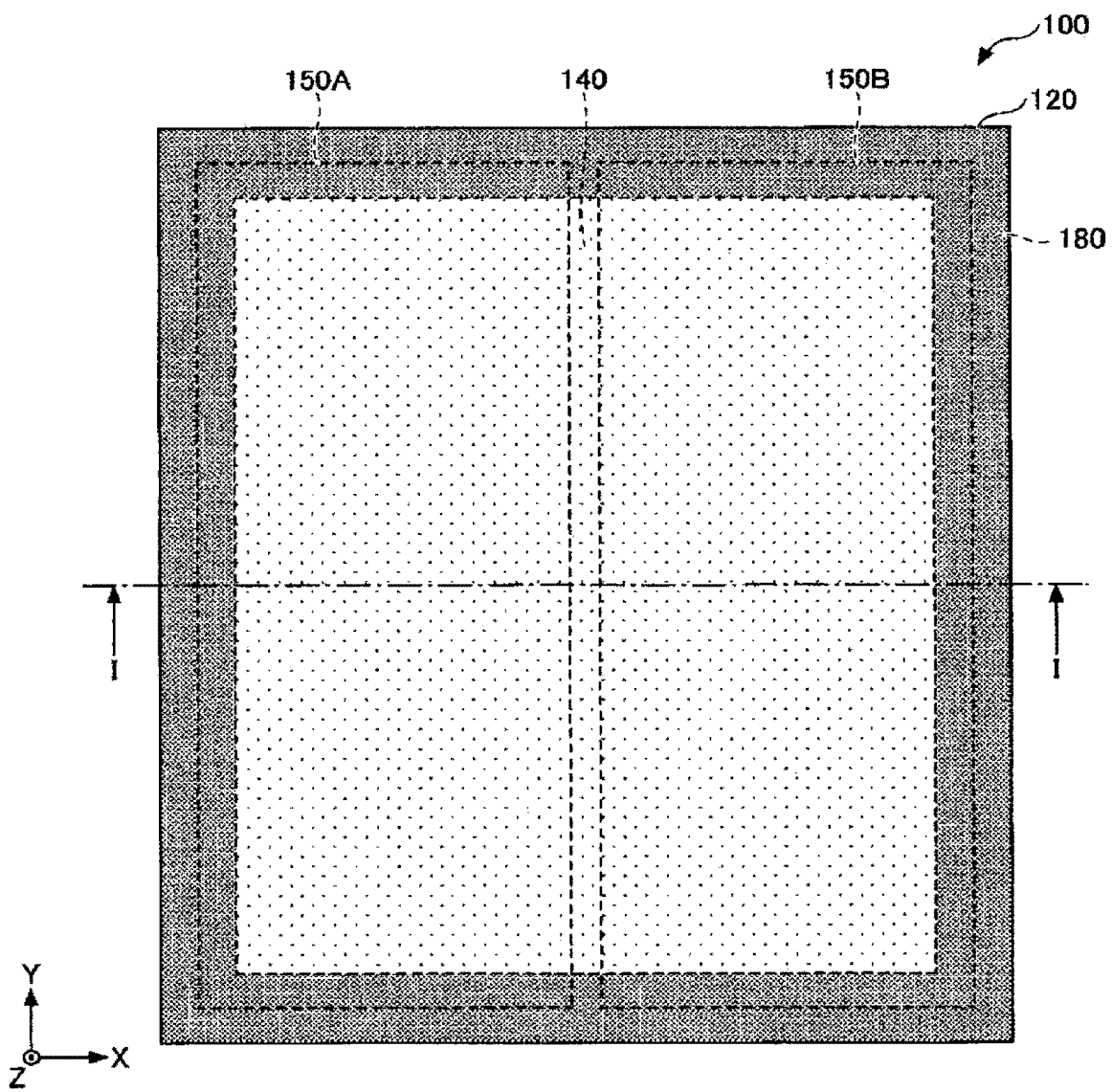
FIG. 1 is a plan view schematically illustrating laminated glass according to one embodiment of the present invention.

One embodiment of the present invention will be described below.

As mentioned above, in a case where a single functional member is sealed between the interlayers of laminated glass, the problem of wrinkling of the functional member may occur. In particular, in a case where the glass substrate has a curved surface shape and the functional member has higher rigidity than the interlayers, it becomes difficult for the functional member to follow the curved surface of the glass substrate, and the wrinkling becomes more pronounced.

In contrast, one embodiment of the present invention provides laminated glass having a first glass substrate and a second glass substrate laminated to each other, which has
  a first interlayer disposed between the first glass substrate and the second glass substrate and being in contact with the first glass substrate,
  a second interlayer disposed between the first glass substrate and the second glass substrate and being in contact with the second glass substrate, and
  first and second functional members disposed between the first interlayer and the second interlayer and being in contact with the first interlayer and the second interlayer, wherein
  the first and second functional members have a higher rigidity than the first and second interlayers,
  the first and second functional members are spaced apart from each other by a distance d when the laminated glass is viewed in plan view, and
  said distance d is at least 15 mm.

In one embodiment of the present invention, a plurality of functional members are disposed as spaced apart from each other between the first interlayer and the second interlayer, along the plane direction of the surface of the first or second glass substrate. In such a disposition form of functional members, wrinkles that may occur in the functional members can be significantly reduced, as compared to the case where a single "large" functional member is sealed between the interlayers.

In this application, the "plane direction" means the direction in which the surface on the side at which the first interlayer is installed on the first glass substrate or the surface at which the second interlayer is installed on the second glass substrate, extends.

Further, "viewed in plan view" means viewing a predetermined area from the direction normal to the predetermined area. Unless otherwise specified, "viewed in plan view" simply means viewing laminated glass from the direction normal to the laminated glass. A planar shape means the shape of a predetermined area as viewed from the direction normal to the predetermined area.

However, simply by disposing a plurality of divided functional members to be spaced apart from each other along the plane direction of the surface of the first or second glass substrate, the likelihood that air bubbles will remain in the area (hereinafter referred to as the "gap") between functional members will be high.

Whereas, in one embodiment of the present invention, the two functional members are disposed to be spaced apart from each other so that the distance d between them, as viewed in plan view of the laminated glass, will be at least 15 mm.

In such a case, air bubbles are less likely to stagnate in the gap between the two functional members during the production process of the first laminated glass 100.

As a result, according to one embodiment of the present invention, it becomes possible to provide laminated glass in which air bubbles remaining inside are significantly reduced.

Here, in a case where the laminated glass is flat, the aforementioned distance d is defined as the minimum linear length in the gap between the two functional members as viewed in plan view of the laminated glass.

On the other hand, in a case where the laminated glass is curved, the distance d is defined as the minimum length of the curved line between the two functional members, i.e. not the minimum linear length of the gap between them. Further, in such a case, the dimension of the distance d varies to some extent between the first glass substrate side and the second glass substrate side of the laminated glass. Therefore, in the present application, in the case of laminated glass with a curved surface shape, the value when measured on the outer convex surface is defined as the distance d.

In laminated glass according to one embodiment of the present invention, the aforementioned distance d is preferably at least 20 mm. In such a case, it is possible to further reduce the residual air bubbles inside. The aforementioned distance d is more preferably at least 30 mm, further preferably at least 40 mm, particularly preferably at least 60 mm.

On the other hand, the aforementioned distance d is preferably at most 110 mm.

If the distance d becomes too large, the area where the functional member is not present along the plane direction of the first glass substrate or the second glass substrate becomes wider, and this increases the likelihood that the uniformity of the thickness of the first or second interlayer, as well as the uniformity of the thickness of the laminated glass, will be reduced. Further, this may also cause distortion of the image reflected from the laminated glass.

However, by setting the distanced to be at most 110 mm, the reduction in uniformity of the thickness of the laminated glass can be suppressed, and such reflected image distortion problem can be suppressed.

The distanced is more preferably at most 100 mm, further preferably at most 80 mm, particularly preferably at most 60 mm.

Laminated Glass According to One Embodiment of the Present Invention

Next, with reference to FIGS. 1 to 3, laminated glass according to one embodiment of the present invention will be described more specifically.

FIG. 1 shows a schematic plan view of laminated glass according to one embodiment of the present invention. Further, FIG. 2 shows a schematic perspective view of the laminated glass according to one embodiment of the present invention shown in FIG. 1. Furthermore, FIG. 3 schematically shows a cross section at line I-I in FIG. 1.

Figure 2:
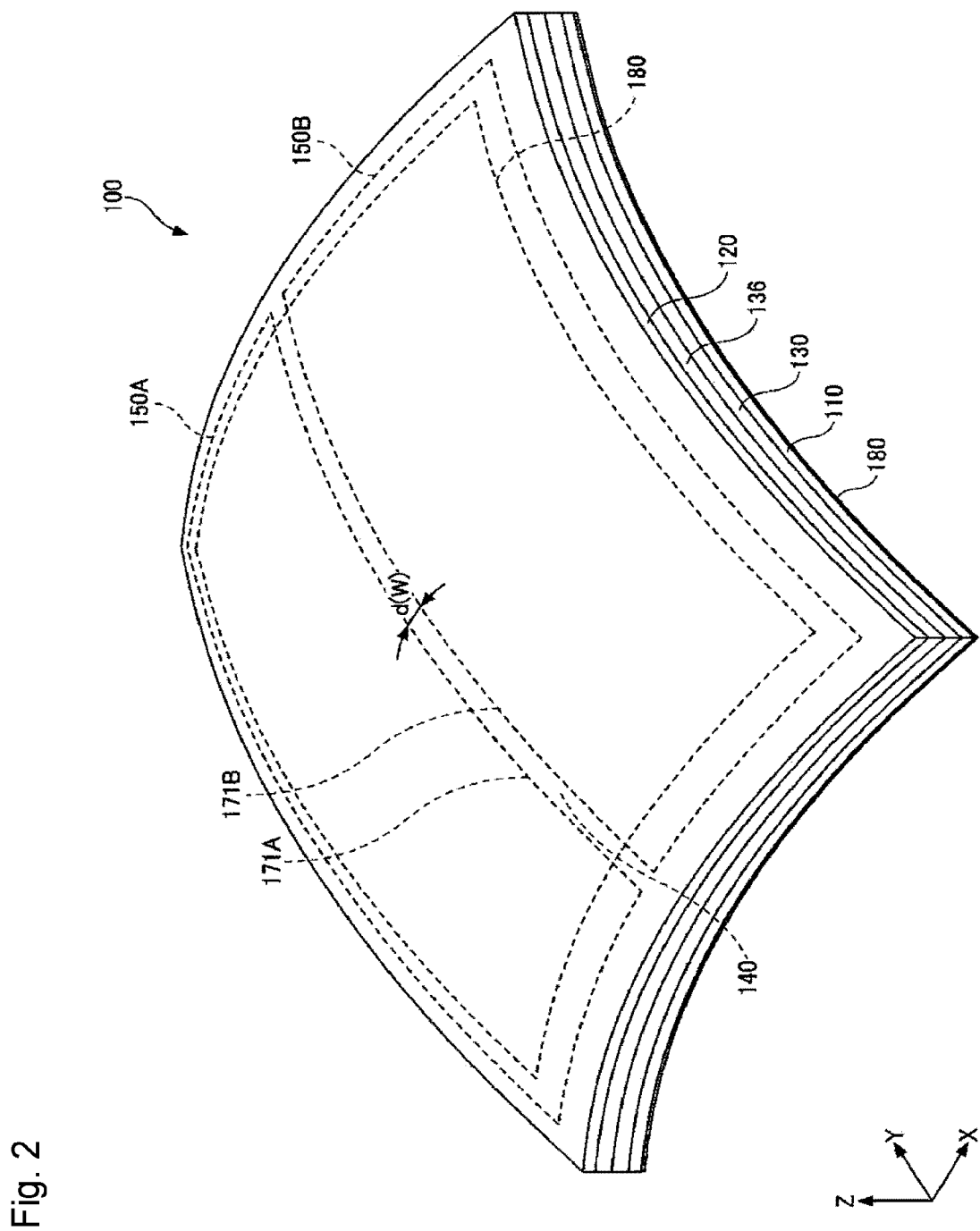
FIG. 2 is a schematic perspective view of the laminated glass according to one embodiment of the present invention shown in FIG. 1.
Figure 3:
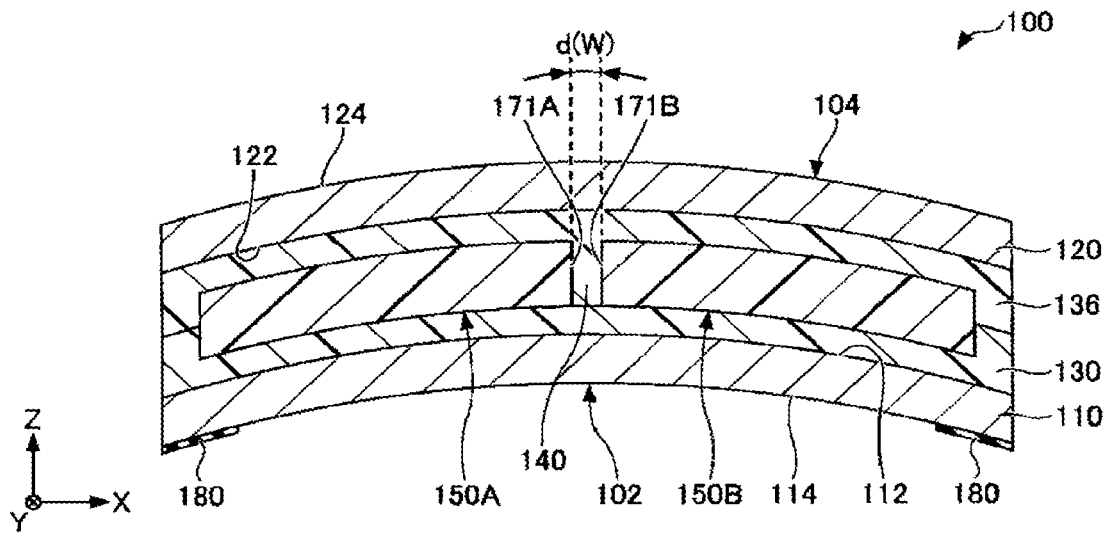
FIG. 3 is a cross-sectional view schematically illustrating the cross section at line I-I in FIG. 1.

As shown in FIGS. 1 to 3, laminated glass (hereinafter referred to as "first laminated glass") 100 according to one embodiment of the present invention has a first glass substrate 110, a first interlayer 130, a second interlayer 136 and a second glass substrate 120. Further, as shown in FIG. 3, the first laminated glass 100 has a first side 102 and a second side 104.

Further, as apparent from FIGS. 2 and 3, the first laminated glass 100 has a curved surface shape. The curved surface shape includes a single directionally curved shape, where the laminated glass has curvature in one direction, and a multi-directionally curved shape, where the laminated glass has curvature in two orthogonal directions. However, this is just an example, and the first laminated glass 100 may also be flat.

The first glass substrate 110 has mutually opposed first surface 112 and second surface 114, and the first interlayer 130 is disposed on the side of the first surface 112 of the first glass substrate 110. Similarly, the second glass substrate 120 has mutually opposed first surface 122 and second surface 124, and the second interlayer 136 is disposed on the side of the first surface 122 of the second glass substrate 120. Here, in the first glass substrate 110, the surface in contact with the first interlayer 130 is referred to as the first surface B, and the surface that is not in contact with the first interlayer 130 is referred to also as the second surface B. Further, in the second glass substrate 120, the surface in contact with the second interlayer 136 is referred to as the first surface A, and the surface that is not in contact with the second interlayer 136 is referred to also as the second surface A.

The first glass substrate 110 and the second glass substrate 120 are mutually laminated so that the first interlayer 130 and the second interlayer 136 face each other. The second surface 114 of the first glass substrate 110 corresponds to the first side 102 of the first laminated glass 100, and the second surface 124 of the second glass substrate 120 corresponds to the second side 104 of the first laminated glass 100.

In a case where the laminated glass according to one embodiment of the present invention has a convex shape as shown in FIGS. 2 and 3, the first side 102 located inside of the convex surface, is referred to as the "inside (of the laminated glass)" and the second side 104 located outside of the convex surface, is referred to as the "outside (of the laminated glass)". Thus, the first glass substrate 110 is disposed on the inside of the first laminated glass 100, and the second glass substrate 120 is disposed on the outside of the first laminated glass 100.

On the other hand, in a case where the laminated glass according to one embodiment of the present invention is flat, then either the first side 102 or the second side 104 may be referred to as the "inside (of the laminated glass)" and the other may be referred to as the "outside (of the laminated glass)".

Further, the first laminated glass 100 has, on the second surface 114 of the first glass substrate 110, a shielding layer 180 disposed in a framed pattern along the periphery of the second surface 114.

Furthermore, the first laminated glass 100 has a first functional member 150A and a second functional member 150B sealed between the first interlayer 130 and the second interlayer 136. The first functional member 150A and the second functional member 150B are disposed along the plane direction of the first laminated glass 100. Further, the first functional member 150A and the second functional member 150B are disposed apart from each other in the plane direction. In other words, between the first functional member 150A and the second functional member 150B, there is an area (hereinafter referred to as a "gap") 140 in which no functional member is present.

Here, in a case where three or more functional members are disposed in the plane direction of the first laminated glass 100, it is preferred that a gap 140 exists between any two of the three or more functional members that are in close proximity to each other.

Here, as mentioned above, the "plane direction" means, in the first laminated glass 100, the direction in which the first surface 112 of the first glass substrate 110, or the first surface 122 of the second glass substrate 120, extends.

The first functional member 150A and the second functional member 150B are disposed so as to be spaced apart from each other so that the distance d between them becomes to be at least 15 mm.

Here, in the case of the first laminated glass 100 having a curved surface shape, as mentioned above, the distance d is defined to be, not the minimum distance of the gap 140 between the first functional member 150A and the second functional member 150B, but the minimum length of the curved line between them (see FIGS. 2 and 3).

In the first laminated glass 100, two functional members 150A and 150B are disposed so as to be spaced apart from each other. Therefore, wrinkles that may occur in both functional members 150A and 150B can be significantly suppressed.

Further, in the first laminated glass 100, the two functional members 150A and 150B are disposed so as to be spaced apart from each other so that the distance d between them will be at least 15 mm. Therefore, in the first laminated glass 100, air bubbles remaining inside can be significantly reduced.

(Respective Constituting Members)

Next, the respective constituting members contained in the laminated glass according to one embodiment of the present invention will be described in more detail. Here, the aforementioned first laminated glass 100 will be used as an example to describe the constituting members. Accordingly, the reference symbols used in FIGS. 1 to 3 will be used to represent the respective constituting members.

(First Glass Substrate 110 and Second Glass Substrate 120)

The composition of the first glass substrate 110 is not particularly limited. The first glass substrate 110 may be, for example, inorganic glass such as soda-lime glass or aluminosilicate, or organic glass, but inorganic glass is preferred.

The thickness of the first glass substrate 110 is not particularly limited, but is generally within a range of from 0.1 mm to 10 mm, and may be suitably selected depending on the type or portion of the vehicle to which the first laminated glass 100 is to be applied. The thickness of the first glass substrate 110 is, from the viewpoint of impact resistance to flying stones, preferably at least 0.3 mm, more preferably at least 0.5 mm, further preferably at least 0.7 mm, particularly preferably at least 1.1 mm, most preferably at least 1.6 mm.

Further, in order to suppress the mass of the first laminated glass 100, the thickness of the first glass substrate 110 is preferably at most 3 mm, more preferably at most 2.6 mm, further preferably at most 2.1 mm.

Also with respect to the second glass substrate 120, the same may be said as the first glass substrate 110. Here, the second glass substrate 120 may have a composition different from the first glass substrate 110 and/or a thickness different from the first glass substrate 110. For example, the first glass substrate 110 may be thinner than the second glass substrate 120.

(First Interlayer 130 and Second Interlayer 136)

The first interlayer 130 is usually composed of a resin. The first interlayer 130 may be composed of, for example, a thermoplastic resin, a thermosetting resin, or a light-curing composition. As the thermoplastic resin, for example, a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin (EVA), a cyclo-olefin polymer (COP), an ethylene-ethyl acrylate copolymerized resin, etc. may be used. Further, a resin composition containing a modified block copolymer hydride as described in Japanese Patent No. 6,065,221 may also be used.

Among these, a plasticized polyvinyl acetal resin and EVA are preferred. This is because the plasticized polyvinyl acetal resin and EVA are excellent in balance of various performances such as transparency, weather resistance, strength, adhesive strength, impact energy absorption, moisture resistance, heat insulation, and sound insulation.

The term "plasticized" in a plasticized polyvinyl acetal resin means that it is plasticized by the addition of a plasticizer. The same applies to other plasticized resins.

One type of the aforementioned thermoplastic resins may be used alone, or two or more types of them may be used in combination.

As the polyvinyl acetal resin, a polyvinylformal resin obtainable by reacting polyvinyl alcohol (PVA) with formaldehyde, a polyvinyl acetal resin in the narrow sense obtainable by reacting PVA with acetaldehyde, a polyvinyl butyral resin obtainable by reacting PVA with n-butyraldehyde, etc., may be mentioned. In particular, PVB is preferred because of its excellent balance of various performances such as transparency, weather resistance, strength, adhesive strength, penetration resistance, impact energy absorption, moisture resistance, thermal barrier properties and sound insulation properties. Here, one type of these polyvinyl acetal resins may be used alone, or two or more types of them may be used in combination.

The first interlayer 130 may contain functional particles such as infrared absorbers, ultraviolet absorbers, colorants and luminescent agents.

Further, the first interlayer 130 may be composed of two or more layers. For example, the first interlayer 130 may be composed of three layers, wherein the hardness of the center layer is made to be lower than the hardness of the respective layers on both sides, to improve sound insulation. In such a case, the hardness of the layers on both sides may be the same or different.

The thickness of the first interlayer 130 is, for example, at least 0.3 mm at the thinnest part and at most 3 mm at the thickest part. By making the thickness to be at least 0.3 mm, impact resistance can be enhanced. By making the thickness to be at most 3 mm, the mass of the first laminated glass 100 can be suppressed.

Also with respect to the second interlayer 136, the same as the first interlayer 130 may be said. Here, the second interlayer 136 may be composed of a material different from the first interlayer 130, and/or may have a thickness different from the first interlayer 130.

Here, at the gap 140, the first interlayer 130 may be in direct contact with the second interlayer 136. In such a case, the height level at which they are in contact is not particularly limited. For example, as shown in FIG. 3, at the gap 140, the second interlayer 136 may be in contact with the first interlayer 130 in the plane on the first side 102 among the planes of the first functional member 150A and the second functional member 150B. Otherwise, the second interlayer 136 may be in contact with the first interlayer 130 in the plane on the second side 104 among the planes of the first functional member 150A and the second functional member 150B. Otherwise, the second interlayer 136 may be in contact with the first interlayer 130 at an optional position from the plane on the first side 102 to the plane on the second side 104 among the planes of the first functional member 150A and the second functional member 150B.

Further, at the periphery of the first laminated glass 100, between the first interlayer 130 and the second interlayer 136, a third interlayer (not shown) may be further present. For the material, thickness, etc. of the third interlayer, the description of the first interlayer 130 may be referred to.

(First Functional Member 150A and Second Functional Member 150B)

The first functional member 150A and the second functional member 150B (hereinafter collectively referred to as "functional members 150") to be sealed between the first interlayer 130 and the second interlayer 136 have, for example, a thickness in a range of from 50 μm to 500 μm. The functional members 150 may have a thickness in a range of from 100 μm to 250 μm. Further, in a case where the first laminated glass 100 has three or more functional members, all of the three or more functional members are collectively referred to also as "functional members 150".

The functional member 150 may be composed of a single layer or may be composed of multiple layers.

The functional members 150 have a higher rigidity than the first interlayer 130 and the second interlayer 136. The rigidity may be expressed, for example, by the tensile modulus of elasticity. The tensile modulus of elasticity of the functional members 150 measured at 25° C. and 1 Hz by using DVA220 manufactured by ITK Co., Ltd., is, for example, preferably at least 1 GPa.

Here, in a case where the functional member 150 is constituted by multiple layers, the tensile modulus of elasticity of the functional member 150 represents the highest tensile modulus of elasticity among the layers constituting the functional member 150.

Further, the functional member 150 has a maximum dimension in the range of from 300 mm to 3,000 mm.

Here, the "maximum dimension" means the longest dimension taking the gap 140 into account, in the functional member 150. The maximum dimension of the functional member 150 may also be said to be the maximum dimension of the "functional member area" as described below. For example, in a case where the functional member 150 is a rectangular-shaped film, the "maximum dimension" represents the length between the two most separated vertices in the rectangle. Further, in a case where the functional member 150 is a circular film, the "maximum dimension" represents the length of the diameter plus a distance d. In the case of other forms, the maximum dimension is determined in the same manner.

The type of the functional member 150 is not particularly limited. For example, the functional member 150 may be a display or a light control film. The display may be one using a light emitting diode (LED), an organic light emitting diode (OLED), inorganic EL, laser, or the like. In the following, an example where the functional member 150 is a light control film will be described, but the present invention is not limited to this.

Figure 4:
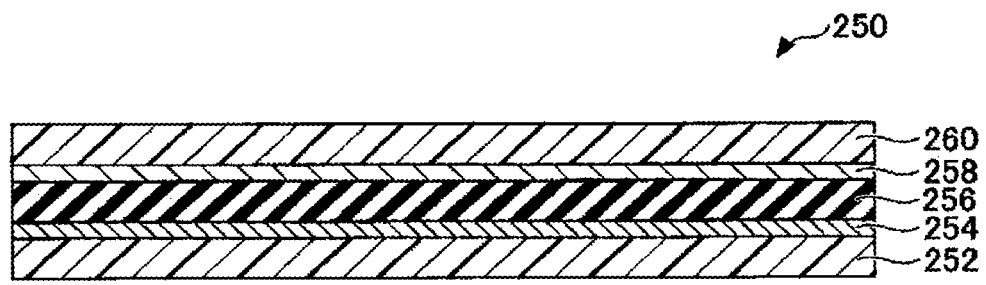
FIG. 4 is a cross-sectional view schematically illustrating one construction example of a light control film to be sealed in laminated glass according to one embodiment of the present invention.

FIG. 4 is a cross-sectional view schematically illustrating one construction example of a light control film that may be used in laminated glass according to one embodiment of the present invention.

As shown in FIG. 4, this light control film 250 has a first resin layer 252, a first conductive layer 254, a light control element 256, a second conductive layer 258 and a second resin layer 260, in this order.

Although not shown in FIG. 4, the light control film 250 has electrodes which are, respectively, electrically connected to the first conductive layer 254 and the second conductive layer 258. Via the electrodes, a voltage is applied between the first conductive layer 254 and the second conductive layer 258, whereby the light control element 256 will be driven.

The first resin layer 252 is composed, for example, of a transparent resin.

The first resin layer 252 may have at least one selected from the group consisting of, for example, polyethylene terephthalate (PET), polyethylene naphthalate, polyamide, polyether, polysulfone, polyethersulfone, polycarbonate, polyarylate, polyetherimide, polyether ether ketone, polyimide, aramid, polybutylene terephthalate, triacetyl cellulose, polyurethane and cyclo-olefin polymer.

In particular, the first resin layer 252 preferably has at least one selected from the group consisting of polyethylene terephthalate, polycarbonate and cyclo-olefin polymer, more preferably is composed of any one of them.

The thickness of the first resin layer 252 is, for example, in a range of from 5 μm to 500 μm. The thickness of the first resin layer 252 is preferably in a range of from 10 μm to 200 μm, more preferably in a range of from 50 μm to 150 μm.

With respect to the second resin layer 260, the same as the first resin layer 252 may be said. Here, the second resin layer 260 may be composed of a material different from the first resin layer 252, and/or may have a thickness different from the first resin layer 252.

The first conductive layer 254 may be composed, for example, of a transparent conductive oxide (TCO: Transparent Conductive Oxide).

TCO may, for example, be tin-doped indium oxide (ITO: Tin-doped Indium Oxide), aluminum-doped zinc oxide (AZO: Aluminum-doped Zinc Oxide), and indium-doped cadmium oxide.

Otherwise, as the first conductive layer 254, a transparent conductive polymer, such as poly(3,4-ethylenedioxythiophene) (PEDOT) or poly(4,4-dioctylcyclopentadithiophene), may be used.

Alternatively, as the first conductive layer 254, a laminated film of a metal layer and a dielectric layer, a silver nanowire, or a silver or copper metal mesh, may be used.

The first conductive layer 254 may be formed by using, for example, a physical vapor deposition (PVD: Physical Vapor Deposition) method such as a sputtering method, a vacuum deposition method or an ion plating method. Otherwise, the first conductive layer 254 may be formed by using a chemical vapor deposition (CVD: Chemical Vapor Deposition) method or a wet coating method.

The thickness of the first conductive layer 254 is not particularly limited, but may be, for example, in a range of from 200 nm to 2 μm.

Also with respect to the second conductive layer 258, the same as the first conductive layer 254 may be said. However, the second conductive layer 258 may be composed of a material different from the first conductive layer 254 and/or may have a thickness different from the first conductive layer 254.

The light control element 256 may be selected from the group consisting of, for example, a suspended particle device (Suspended Particle Device: SPD), polymer dispersion liquid crystal (PDLC), polymer network liquid crystal (PNLC), guest-hosted liquid crystal (GHLC), photochromics, electrochromics, and electrokinetics.

Here, as the light control film 250, a commercially available film may be used. For example, as a light control element 256, a film using SPD (LCF-1103 DHA: Hitachi Chemical Company, Ltd.) may be used.

In a case where a light control film 250 is used as the functional member 150, the light transmittance in the first laminated glass 100 may be optionally switched depending on the environment.

In the foregoing description, it is assumed that the functional member 150 has a substantially rectangular planar shape in plan view. However, the planar shape of the functional member 150 is not necessarily limited to a rectangle. For example, the functional member 150 may have a planar shape of circular, oval, triangular or n-angular (n is an integer of at least 5).

Further, in the above description, it is also assumed that each of the first functional member 150A and the second functional member 150B has two opposing planes being a rectangular planar shape, as well as four sides.

Furthermore, in the above description, an embodiment has been assumed such that the first functional member 150A and the second functional member 150B are mutually disposed so that one side (referred to as the "first side") 171A of the first functional member 150A faces substantially in parallel to one side (referred to as the "first side") 171B of the second functional member 150B (see FIG. 3).

In such a case, the width W between the first side 171A of the first functional member 150A and the first side 171B of the second functional member 150B, corresponds to the aforementioned distance d. Therefore, in such a case, the distance d can be defined over the area where in the plan view of the first laminated glass 100, the first side surface 171A of the first functional member 150A and the first side surface 171B of the second functional member 150B mutually face each other.

It should be noted, however, that such an embodiment is just one example.

For example, in a case where the first functional member 150A and the second functional member 150B both have a circular planar shape, in the gap 140 between both functional members 150A and 150B, there is only one location where the distance d can be defined. The same is true also in a case where the two functional members 150 have a polygonal planar shape and both are disposed so that they face each other at the vertices.

Alternatively, in a case where the functional members 150 include three or more functional members, e.g. even in a case where as the functional members 150, four rectangular functional members are disposed so that two will be vertical and two will be horizontal, there may be a case where there is only one location where the distance d can be defined. Further, there may be the case where the distance d can be defined for the respective two functional members that are in closest proximity.

However, it should be clear that even in such a case, as long as the distance d≥15 mm is satisfied, the aforementioned effect of reducing residual air bubbles can be achieved. Also, in a case where the functional members 150 include three or more functional members and the distance d can be defined for the respective two functional members that are in closest proximity to each other, then for at least one distance d, as long as the distance d ≥15 mm is satisfied, the aforementioned effect of reducing residual air bubbles can be achieved. However, it is preferred that the distance d≥15 mm be satisfied for any distance d.

(Shielding Layer 180)

The shielding layer 180 is composed of, for example, an opaque layer, but it is sufficient if it can block visible light to such an extent that at least in an area where concealment is required, the area can be concealed. For example, the shielding layer 180 may be composed of an organic ink or colored ceramics. The shielding layer 180 may be any color, but a dark color such as black, brown, gray or dark blue, is preferred, and black is more preferred.

The thickness of the shielding layer 180 is not particularly limited, but it may, for example, be in a range of from 1 μm to 30 μm, preferably from 5 μm to 20 μm.

In the example shown in FIGS. 1 to 3, the shielding layer 180 is provided on the first side 102 of the first laminated glass 100. Specifically, it is provided on the second surface 114 of the first glass substrate 110. However, this is just an example, and the shielding layer 180 may be provided on the first surface 122 of the second glass substrate 120. Otherwise, the shielding layer 180 may be provided on both of the second surface 114 of the first glass substrate 110 and the first surface 122 of the second glass substrate 120.

In a case where the first laminated glass 100 is used in such a manner that the first side 102 is the indoor (interior) side and the second side 104 is the outdoor (exterior) side, by providing a shielding layer 180 on the first surface 122 and/or on the second surface 114, it is possible to prevent the urethane resin used in bonding the first laminated glass 100 to the vehicle, from being deteriorated by ultraviolet rays, etc.

Further, by providing a shielding layer 180 on the second surface 114 and/or on the first surface 122, it is possible to make it difficult to see the various wiring, etc. installed on the periphery of the first laminated glass 100, from the outside.

Furthermore, in a case where the functional members 150 have a rectangular planar shape, at least one of the functional members 150 may be disposed so that in the planar view, at least one edge is covered by the shielding layer 180. It is thereby possible to make it difficult for the boundary of the functional members 150 to be seen. For example, in the above-described example shown in FIG. 1, in plan view, all sides of the first functional member 150A except one long side (the side corresponding to the first side 171A) are covered with the shielding layer 180. The same is true for the second functional member 150B.

(First Laminated Glass 100)

The first laminated glass 100 having the features as described above can be applied, for example, to a glass member for a vehicle. The glass member for a vehicle may be, for example, a windshield, rear glass, other fitted window glass, side glass or roof glass.

In a case where the first laminated glass 100 is applied to a glass member for a vehicle, the first laminated glass 100 may be applied so that the first side 102 becomes to be the inside side of the vehicle and the second side 104 becomes to be the outside side of the vehicle.

As mentioned above, the first laminated glass 100 may be flat or curved.

In a case where the first laminated glass 100 is curved in shape, among the cross sections including the normal at the center of gravity of the second surface 124 of the second glass substrate 120, the cross section where the radius of curvature of the second surface 124 becomes to be the smallest, is referred to as the longitudinal cross section. Further, when the longitudinal cross section is viewed from the above normal direction, the direction in which the longitudinal cross section extends, will be regarded as the first direction, and the direction orthogonal to the first direction will be regarded as the second direction.

For example, in FIG. 1, the first direction may be the X-direction, and the second direction may be the Y-direction. Here, the first and second directions can be defined even if the first laminated glass 100 is single directionally curved.

Further, in a case where the first laminated glass 100 is viewed in plan view, the first functional member 150A, the second functional member 150B and the gap 140 put together may be referred to as the functional member area. In a case where the first laminated glass 100 contains three or more functional members, when the first laminated glass 100 is viewed in plan view, the three or more functional members and the respective gaps 140 put together, may be referred to also as the functional member area.

Further, when the first laminated glass 100 is viewed in plan view, the portion including the first functional member 150A will be also referred to as the first functional member area, and the area including the second functional member 150B will be also referred to as the second functional member area.

For example, in FIG. 1, the functional member area is the area formed when the edges (dashed lines) constituting the perimeters of the first functional member 150A and the second functional member 150B are extended in their respective directions.

The present inventors have found it possible to significantly prevent wrinkles of the functional members 150 when in the first laminated glass 100, a specific relationship is established between the radius of curvature of the second glass substrate 120 and the dimensions of the functional member area, i.e. when the following formula (1) holds.

$$2400 > \left\{ Rx - \sqrt{Rx^2 - \left(\frac{Lx}{2}\right)^2} \right\} \times \left\{ Ry - \sqrt{Ry^2 - \left(\frac{Ly}{2}\right)^2} \right\} > 430 \quad \text{Formula (1)}$$

Here, in the formula (1), Rx is the average value (unit: mm) of the radius of curvature, when in the functional member area of the second glass substrate 120, the second surface 124 is measured every 50 mm along the first direction. Further, Ry is the average value (unit: mm) of the radius of curvature, when in the functional member area of the second glass substrate 120, the second surface 124 is measured every 50 mm along the second direction.

Here, the radius of curvature can be measured by evaluating the shape of the three points by e.g. a dial gauge. As the distance of the three points, a predetermined value between 10 mm and 150 mm may be optionally selected. For example, among the three points spaced apart at a distance of 100 mm, the measurement may be made so that the distance between the center points becomes to be 50 mm.

Further, in the formula (1), Lx is the maximum length (unit: mm) in the first direction of the functional member area along the plane direction, and Ly is the maximum length (unit: mm) in the second direction of the functional member area along the plane direction.

In a case where the above formula (1) is satisfied, it is possible to more effectively suppress wrinkles of the functional members 150. The value of the formula (1) is preferably smaller than 2100, more preferably smaller than 1750. In these cases, it is possible to further effectively suppress wrinkles of the functional members 150. The formula (1) can approximately represent the both effects of the degree of curvature in the first direction and the degree of curvature in the second direction, of the first laminated glass 100 having a three-dimensional curved surface shape.

Further, the present inventors have found it possible to significantly prevent wrinkles of the first functional member 150A, when in the first laminated glass 100, a specific relationship holds with respect to the shape of the first glass substrate 110 in the encapsulated area of the first functional member 150A and the dimensions of the first functional member 150A, i.e. when the following formula (2) holds for the first functional member area of the first glass substrate 110.

$$\left(\frac{Dx}{Lx0} \times 100\right) \times \left(\frac{Dy}{Ly0} \times 100\right) < 5.5 \quad \text{Formula (2)}$$

Here, in the formula (2), Dx is the maximum bending depth (unit: mm) in the first direction of the first glass substrate 110 in the first functional member area, and Dy is the maximum bending depth (unit: mm) in the second direction of the first glass substrate 110 in the first functional member area. Dx is determined, for example, as follows.

In the first functional member area on the second surface 114 of the first glass substrate 110, a virtual straight line S orthogonal to a pair of edges extending in the second direction of the first functional member area and extending in the first direction, is drawn. Then, from the virtual straight line S, a perpendicular line is drawn down toward the first glass substrate 110 (second surface 114). The maximum length of the perpendicular line is Dx. Here, the length of the perpendicular line varies depending on how the virtual straight line S is drawn, but the maximum length Dx is the longest among those different lengths of perpendicular lines. With respect to Dy, in the first functional member area on the second surface 114 of the first glass substrate 110, a virtual straight line S orthogonal to a pair of edges extending in the first direction of the first functional member area and extending in the second direction, is drawn, and thereafter, it is determined in the same manner as Dx.

Further, in the formula (2), Lx0 is the maximum length (unit: mm) in the first direction along the second surface 114 direction of the first functional member area, and Ly0 is the maximum length (unit: mm) in the second direction along the second surface 114 direction of the first functional member area. Lx0 and Ly0 are obtainable by measuring the second surface 124 along the first and second directions, respectively, in the first functional member area of the second glass substrate 120.

In a case where the above formula (2) holds for the first functional member 150A, it is possible to prevent wrinkles of the first functional member 150A more effectively. The value of the left side of the formula (2) is more preferably at most 4.5, further preferably at most 4.0, still more preferably at most 3.5. The formula (2) is capable of approximately representing both effects of the degree of curvature in the first direction and the degree of curvature in the second direction of the first laminated glass 100 having a three-dimensional curved surface shape.

Similarly, the above formula (2) can be applied to the second functional member 150B. That is, when the formula (2) holds with respect to the maximum bending depth of the first glass substrate 110 and the dimensions of the second functional member 150B, it is possible to significantly prevent wrinkles of the second functional member 150B. Here, when the above formula (2) is to be applied to the second functional member 150B, the first functional member 150A may be read as the second functional member 150B. It is preferred that the above formula (2) holds for at least one of the first functional member 150A and the second functional member 150B, and it is more preferred that it holds for both of them.

In a case where the first laminated glass 100 contains three or more functional members, the above formula (2) may be applied by taking any optional two functional members as the first functional member 150A and the second functional member 150B. However, even if any of the functional members is taken as the first functional member 150A or the second functional member 150B, it is most preferred that the above formula (2) holds.

Method for Producing Laminated Glass According to One Embodiment of the Present Invention Next, with reference to FIG. 5, an example of the method for producing laminated glass according to one embodiment of the present invention will be described.

Figure 5:
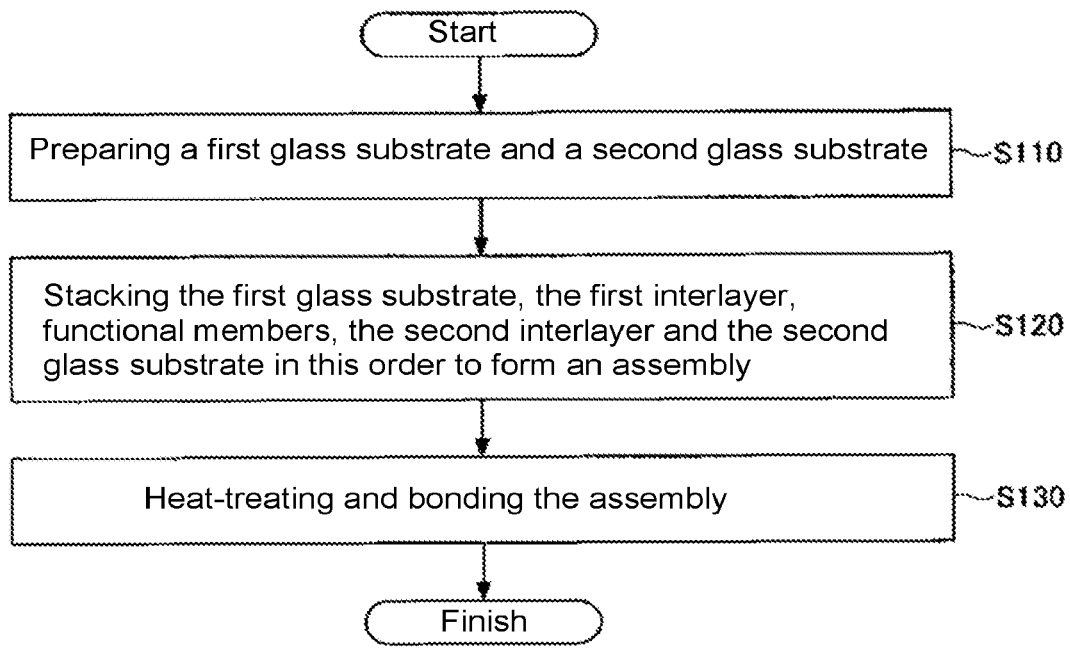
FIG. 5 is a diagram schematically illustrating the flow of the method for producing laminated glass according to one embodiment of the present invention.

FIG. 5 schematically shows a flow of the method for producing laminated glass according to one embodiment of the present invention.

As shown in FIG. 5, the method for producing laminated glass according to one embodiment of the present invention, has (1) a step (step S110) of preparing a first glass substrate and a second glass substrate,
(2) a step (step S120) of stacking the first glass substrate, the first interlayer, functional members, the second interlayer and the second glass substrate in this order to form an assembly, and
(3) a step (step S130) of heat-treating and bonding the assembly.

In the following, the respective steps will be described. Here, for the sake of clarity, taking the first laminated glass 100 as an example, its production method will be described. Therefore, the reference symbols described in FIGS. 1 to 3 will be used to represent the respective components.

(Step S110)

First, a first glass substrate 110 and a second glass substrate 120 are prepared.

If necessary, a shielding layer 180 may be installed in a framed manner along the periphery on one surface (e.g. the second surface 114) of the first glass substrate 110. The shielding layer 180 may be formed, for example, by installing a paste for the shielding layer 180 along the periphery of the second surface 114 of the first glass substrate 110 and then firing this paste. As the method for installing the paste, any conventional method, such as a screen printing method, may be used.

Further, if necessary, another shielding layer may be installed in a framed manner along the periphery of one surface (e.g. the first surface 122) of the second glass substrate 120.

Furthermore, if necessary, a bending process may be conducted on the first glass substrate 110 and/or the second glass substrate 120. For example, the bending process may be conducted only on the second glass substrate 120. In such a case, the first glass substrate 110 is flat, and laminated glass can be prepared together with the second glass substrate 120.

The bending process may be a gravity forming process or a press forming process. The bending process may also be conducted in such a state that the first glass substrate 110 and the second glass substrate 120 are heated. Both glass substrates 110 and 120 may be bent processed separately or simultaneously. The heating temperature varies depending on the type of glass substrate, but, for example, it is within a range of from 550° C. to 700° C.

Further, in a case where the paste for the shielding layer 180 is installed on the first glass substrate 110, by this bending process, the paste may be fired to form the shielding layer 180. Otherwise, it may be temporarily baked before the bending process.

(Step S120)

Next, on the first surface 112 of the first glass substrate 110, a first resin sheet for the first interlayer 130 is installed.

Next, on the first resin sheet, two or more functional members 150 are installed.

Functional members 150A and 150B may, for example, be light control films 250.

The respective functional members 150 are disposed to be spaced apart from each other along the plane direction of the first surface 112 of the first glass substrate 110. Both functional members 150 are disposed so that the distance d between the two functional members 150 will be at least 15 mm.

Next, on the functional members 150, a second resin sheet for the second interlayer 136 is installed. The second resin sheet may be composed of the same resin as the first resin sheet.

Further, if necessary, along the periphery of the first surface 112 of the first glass substrate 110, a third resin sheet for the third interlayer may be installed. The third resin sheet may also be installed before the installation of the respective functional members 150. This makes it easier to align the installation positions of the respective functional members 150.

Next, the second glass substrate 120 is installed on the second resin sheet to constitute an assembly.

(Step S130)

Next, the assembly is placed in a container. The pressure in the container is reduced to, for example, at most 730 mmHg. Then, the container is heated to a temperature within a range of from 70 to 110° C. in such a state that the container is sealed.

Instead of placing the assembly in a container and depressurizing it, the assembly may be held between a pair of nip rollers and pressurized, or the periphery of the assembly may be covered with a rubber channel and depressurized, and then heated within a range of from 70 to 110° C.

Upon heating, the first resin sheet softens to form the first interlayer 130. Further, the second resin sheet softens to form the second interlayer 136. Thus, via the first interlayer 130, the first glass substrate 110 and the functional members 150 are bonded, and via the second interlayer 136, the second glass substrate 120 and the functional members 150 are bonded.

Further, the gap 140 between the first functional member 150A and the second functional member 150B will be filled by the components of the first resin sheet and/or the components of the second resin sheet, that have penetrated into the gap 140 due to softening.

Thus, after the heat treatment, the gap 140 is filled by the first interlayer 130 and/or the second interlayer 136. Further, in the gap 140, the first interlayer 130 and the second interlayer 136 are directly bonded together.

By the above process steps, it is possible to produce the first laminated glass 100 as shown in the above-described FIGS. 1 to 3.

The above description is merely an example, and laminated glass according to one embodiment of the present invention may be produced by a different method.

EXAMPLES

In the following, Examples of the present invention will be described. Here, in the following description, Ex. 1 to Ex. 10 are Examples of the present invention, and Ex. 11 to Ex. 14 are Comparative Examples.

Ex. 1

Laminated glass was prepared by the following method. The laminated glass was constituted to have a first glass substrate, a first interlayer, functional members, a second interlayer and a second glass substrate in this order. Here, the laminated glass was flat. A shielding layer was not installed.

First, the first and second glass substrates were prepared. The dimensions of the first and second glass substrates were 300 mm in length, 300 mm in width and 2 mm in thickness.

Next, a first resin sheet for the first interlayer was installed on the first glass substrate. The first resin sheet was disposed so that, in plan view, it is approximately aligned with the first surface of the first glass substrate. For the first resin sheet, an ethylene-vinyl acetate copolymer (EVA) sheet (Melsen G7055: manufactured by TOSOH-NIKKEMI CORPORATION) with a thickness of 0.4 mm, was used.

Next, two functional members were placed on the first resin sheet, side by side with each other along the plane direction of the first surface of the first glass substrate. The functional members were square-shaped PET films of 80 mm in length and 80 mm in width. The thickness of the PET films was 100 μm. The respective PET films were disposed roughly at the center of the first resin sheet so that the bottom edges of the PET films were roughly parallel to the bottom edge of the first glass substrate.

In plan view, the width W of the gap between both PET films was 20 mm.

Next, on these PET films, a second resin sheet for the second interlayer was disposed. For the second resin sheet, the same one as the first resin sheet was used. The second resin sheet had the same dimensions as the first resin sheet, and was disposed so that it matched the first resin sheet in plan view.

Next, on the second resin sheet, a second glass substrate was disposed. The second glass substrate was disposed so that, in plan view, the respective sides were aligned with the respective sides of the first glass substrate. An assembly was thereby constituted.

The obtained assembly was placed in a plastic container, and the inside of the container was depressurized to 730 mmHg for 5 minutes. Then, the container was sealed, and the container was heated to 100° C. and held for 1 hour.

Thus, laminated glass (hereinafter referred to as "sample 1") was prepared.

Ex. 2

Laminated glass was prepared by the same method as in Ex. 1. However, in this Ex. 2, the width W of the gap between the two functional members was 30 mm. Other conditions were the same as in Ex. 1. Laminated glass (hereinafter referred to as "sample 2") was thus prepared.

Ex. 3

Laminated glass was prepared by the same method as in Ex. 1. However, in this Ex. 3, the width W of the gap between the two functional members was 60 mm. Other conditions were the same as in Ex. 1. Laminated glass (hereinafter referred to as "sample 3") was thus prepared.

Ex. 4

Laminated glass was prepared by the same method as in Ex. 1. However, in this Ex. 4, the width W of the gap between the two functional members was 100 mm. Other conditions were the same as in Ex. 1. Laminated glass (hereinafter referred to as "sample 4") was thus prepared.

Ex. 5

Laminated glass was prepared by the same method as in Ex. 1. However, in this Ex. 5, the width W of the gap between the two functional members was 120 mm. Other conditions were the same as in Ex. 1. Laminated glass (hereinafter referred to as "sample 5") was thus prepared.

Ex. 6

Laminated glass was prepared by the same method as in Ex. 1. However, in this Ex. 6, as each functional member, one having two layers of a PET film with a thickness of 125 μm laminated, was used. Therefore, the thickness of each functional member is 250 μm. Other conditions were the same as in Ex. 1. Laminated glass (hereinafter referred to as "sample 6") was thus prepared.

Ex. 7

Laminated glass was prepared by the same method as in Ex. 6. However, in this Ex. 7, the width W of the gap between the two functional members was 100 mm. Other conditions were the same as in Ex. 6. Laminated glass (hereinafter referred to as "sample 7") was thus prepared.

Ex. 8

Laminated glass was prepared by the same method as in Ex. 6. However, in this Ex. 8, the width W of the gap between the two functional members was 120 mm. Other conditions were the same as in Ex. 6. Laminated glass (hereinafter referred to as "sample 8") was thus prepared.

Ex. 9

Laminated glass was prepared by the following method. The laminated glass was constituted to have a first glass substrate, a first interlayer, functional members, a second interlayer and a second glass substrate in this order. In Ex. 9, the laminated glass was made in a multi-directionally curved shape. Further, a shielding layer was not installed.

First, first and second glass substrates with a curved shape were prepared. The dimensions of each of the first and second glass substrates were 300 mm in length, 300 mm in width and 2 mm in thickness. The longitudinal and transverse lengths were measured along the main surfaces of the curved first and second glass substrates. Here, the three-dimensional shapes of the first and second glass substrates were roughly identical.

Next, on the first glass substrate, a first resin sheet for the first interlayer was installed. The first resin sheet was disposed so that, in plan view, it is approximately aligned with the first surface of the first glass substrate. As the first resin sheet, an ethylene-vinyl acetate copolymer (EVA) sheet (Melsen G7055: manufactured by TOSOH NIKKEMI CORPORATION) with a thickness of 0.4 mm, was used.

Next, on the first resin sheet, two functional members were installed side by side with each other along the plane direction of the first surface of the first glass substrate. The functional members were rectangular PET films of 125 mm in length and 280 mm in width. The thickness of the PET films was 250 μm. Each PET film was placed symmetrically in a first resin sheet shape so that the bottom edge of the PET film was roughly parallel to the bottom edge of the first glass substrate. At that time, the distances from the peripheries of the first and second glass substrates to the two functional members (PET films) were each 10 mm apart.

In plan view, the width W of the gap between both PET films was 30 mm.

Next, on these PET films, a second resin sheet for the second interlayer was disposed. For the second resin sheet, the same one as the first resin sheet was used. The second resin sheet had the same dimensions as the first resin sheet and was disposed so that it matched the first resin sheet in plan view.

Next, on the second resin sheet, a second glass substrate was disposed. The second glass substrate was disposed so that, in plan view, each side of the second glass substrate was aligned with each side of the first glass substrate. An assembly was thereby constituted.

The obtained assembly was placed in a plastic container, and the inside of the container was depressurized to 730 mmHg for 5 minutes. Then, the container was sealed, and the container was heated to 100° C. and held for 1 hour.

Laminated glass (hereafter referred to as "sample 9") was thus prepared.

Ex. 10

Laminated glass was prepared by the same method as in Ex. 9. However, in this Ex. 10, the first and second glass substrates with a curved shape different from in Ex. 9 were prepared. However, the dimensions (300 mm in length, 300 mm in width and 2 mm in thickness) of the first and second glass substrates and other conditions were the same as in Ex. 9. Laminated glass (hereinafter referred to as "sample 10") was thus prepared.

Ex. 11

Laminated glass was prepared by the same method as in Ex. 1. However, in this Ex. 11, the width W of the gap between the two functional members was 10 mm. Other conditions were the same as in Ex. 1. Laminated glass (hereinafter referred to as "sample 11") was thus prepared.

Ex. 12

Laminated glass was prepared by the same method as in Ex. 6. However, in this Ex. 12, the width W of the gap between the two functional members was 10 mm. Other conditions were the same as in Ex. 6. Laminated glass (hereinafter referred to as "sample 12") was thus prepared.

Ex. 13

Laminated glass was prepared by the same method as in Ex. 9. However, in this Ex. 13, the first and second glass substrates with a curved shape different from in Ex. 9 were prepared. Further, the two functional members are both rectangular PET films of 135 mm in length, 280 mm in width and 250 μm in thickness, and, in plan view, the width W of the gap between the two PET films was 10 mm. The dimensions (300 mm in length, 300 mm in width, and 2 mm in thickness) of the first and second glass substrates and other conditions were the same as in Ex. 9. Laminated glass (hereinafter referred to as "sample 13") was thus prepared.

Ex. 14

Laminated glass was prepared by the same method as in Ex. 13. However, in this Ex. 14, the first and second glass substrates with a curved shape different from in Ex. 13 were prepared. However, the dimensions (300 mm in length, 300 mm in width, and 2 mm in thickness) of the first and second glass substrates and other conditions were the same as in Ex. 13. Laminated glass (hereinafter referred to as "sample 14") was thus prepared.

(Evaluations)

Using the respective samples, the following evaluations were conducted. Further, of samples 9, 10, 13 and 14, the predetermined dimensions were also measured.

(Amount of Residual Air Bubbles)

In each sample, in plan view from the side of the second glass substrate, the amount of air bubbles present in the gap between the two functional members was visually evaluated.

In a case where the total area of residual air bubbles is less than 5 mm$^2$, the amount of residual air bubbles was judged to be "○". In a case where the total area of residual air bubbles is from 5 mm$^2$ to 15 mm$^2$, the amount of residual air bubbles was judged to be "Δ". Further, in a case where the total area of residual air bubbles exceeds 15 mm$^2$, the amount of residual air bubbles was judged to be "×".

(Distortion of Reflected Image)

A zebra board was disposed on the side of the second glass substrate of each sample, and a distortion of the image reflected from the sample was evaluated. In a case where no clear distortion was observed in the reflected image, it was judged to be "○". In a case where a clear distortion was observed in the reflected image, it was judged to be "×". Further, a case between "○" and "×" was judged to be "Δ".

Tables 1 and 2 summarize the results obtained in each sample.

TABLE 1

| Sample | Thickness of inserted films (μm) | Width W of the gap (mm) | Amount of residual air bubbles | Distortion of reflected image |
|---|---|---|---|---|
| 1 | 100 | 20 | Δ | ○ |
| 2 | 100 | 30 | ○ | ○ |
| 3 | 100 | 60 | ○ | ○ |
| 4 | 100 | 100 | ○ | Δ |
| 5 | 100 | 120 | ○ | x |
| 6 | 250 | 20 | Δ | ○ |
| 7 | 250 | 100 | ○ | Δ |
| 8 | 250 | 120 | ○ | x |
| 11 | 100 | 10 | x | — |
| 12 | 250 | 10 | x | — |

TABLE 2

| Sample | Thickness of inserted films (μm) | Width W of the gap (mm) | Dx (mm) | Dy (mm) | Lx (mm) | Ly (mm) | Lx0 (mm) | Ly0 (mm) | Value of the formula 1 | Value of the formula 2 | Amount of residual air bubbles | Presence or absence of wrinkles |
|---|---|---|---|---|---|---|---|---|---|---|---|---|
| 9 | 250 | 30 | 3.0 | 5.0 | 280 | 280 | 125 | 280 | 450 | 4.3 | ○ | ○ |
| 10 | 250 | 30 | 3.3 | 6.6 | 280 | 280 | 125 | 280 | 730 | 6.2 | ○ | X |
| 13 | 250 | 10 | 3.1 | 6.1 | 280 | 280 | 135 | 280 | 550 | 5.0 | X | ○ |
| 14 | 250 | 10 | 3.5 | 7.0 | 280 | 280 | 135 | 280 | 750 | 6.5 | X | X |

As shown in Tables 1 and 2, in sample 11 to sample 14, it was found that a large number of air bubbles remained in the gap between the two functional members. In contrast, in sample 1 to sample 10, it was found that the air bubbles remaining in the gap were significantly suppressed, regardless of the thickness of the functional members.

Further, in sample 5 and sample 8 in which the width of the gap between the two functional members was set to 120 mm, the distortion of the reflected image became larger as compared with in sample 1 to sample 4 and in sample 6 to sample 7. This is considered to be due to that in sample 5 and sample 8, the width W of the gap was relatively wide, whereby the uniformity in the thickness of the laminated glass was lowered.

Accordingly, with a view to suppressing the distortion of the reflected image, it may be said that the width W of the gap is preferably less than 120 mm, e.g. at most 110 mm.

This application is a continuation of PCT Application No. PCT/JP2021/014317, filed on Apr. 2, 2021, which is based upon and claims the benefit of priority from Japanese Patent Application No. 2020-067824 filed on Apr. 3, 2020. The contents of those applications are incorporated herein by reference in their entireties.

REFERENCE SYMBOLS

100: First laminated glass
102: First side
104: Second side
110: First glass substrate
112: First surface B
114: Second surface B
120: Second glass substrate
122: First surface A
124: Second surface A
130: First interlayer
136: Second interlayer
140: Gap
150: Functional members
150A: First functional member
150B: Second functional member
171A: First side of first functional member
171B: First side of second functional member
180: Shielding layer
250: Light control film
252: First resin layer
254: First conductive layer
256: Light control element
258: Second conductive layer
260: Second resin layer

What is claimed is:

1. Laminated A laminated glass, having comprising:
a first glass substrate;
a second glass substrate laminated to the first glass substrate;
a first interlayer disposed between the first glass substrate and the second glass substrate and being in contact with the first glass substrate;
a second interlayer disposed between the first glass substrate and the second glass substrate and being in contact with the second glass substrate; and
first and second functional members disposed between the first and second interlayers and being in contact with the first and second interlayers,
wherein the first and second functional members have a higher rigidity than the first and second interlayers and are spaced apart from each other forming a gap by a distance d of at least 15 mm, the second glass substrate has a first surface A in contact with the second interlayer, a second surface A not in contact with the second interlayer, a functional member area having the first and second functional members and a gap between the first and second functional members, and a longitudinal cross-section in which a radius of curvature of the second surface A becomes the smallest among cross-sections containing the normal at the center of gravity, and when viewed from a normal direction, the longitudinal cross-section extends in a first direction, a second direction is orthogonal to the first direction, and formula (1) holds Formula (1)

$$2400 > \left\{Rx - \sqrt{Rx^2 - \left(\frac{Lx}{2}\right)^2}\right\} \times \left\{Ry - \sqrt{Ry^2 - \left(\frac{Ly}{2}\right)^2}\right\} > 430$$

where Rx is the average value of the radius of curvature in mm, when in the functional member area of the second glass substrate, the second surface A is measured every 50 mm along the first direction, Ry is the average value of the radius of curvature in mm, when in the functional member area of the second glass substrate, the second surface A is measured every 50 mm along the second direction, Lx is a maximum length of the functional member area in the first direction in mm, and Ly is a maximum length of the functional member area in the second direction in mm.

2. The laminated glass according to claim 1, wherein the distance d is at least 20 mm.

3. The laminated glass according to claim 1, wherein the distance d is at most 110 mm.

4. The laminated glass according to claim 3, wherein the distance d is at most 100 mm.

5. The laminated glass according to claim 1, wherein the first and second interlayers are in direct contact with each other in the area where gap between the first and second functional members.

6. The laminated glass according to claim 1, wherein the first and second functional members each have a thickness in a range of 50 μm to 250 μm.

7. The laminated glass according to claim 1, wherein the first and second functional members each have a rectangular film form, and the first and second functional members are disposed such that a first side surface of the first functional member faces parallel to a first side surface of the second functional member.

8. The laminated glass according to claim 1, wherein the first and/or second functional member has a resin layer comprising at least one selected from the group consisting of polyethylene terephthalate, polyethylene naphthalate, polyamide, polyether, polysulfone, polyether sulfone, polycarbonate, polystyrene, cyclic polyolefin, polyarylate, polyetherimide, polyether ether ketone, polyimide, aramid, polybutylene terephthalate, triacetyl cellulose, polyurethane, and cyclo-olefin polymer.

9. The laminated glass according to claim 1, wherein the first and second functional members each comprises one or more layers, and the maximum value among the tensile moduli of elasticity of the respective layers is at least 1 GPa.

10. The laminated glass according to claim 1, wherein the first and second functional members are each a light control film, and the light control film comprises, in order of proximity from the first glass substrate, a first resin layer, a first conductive layer, a light control element, a second conductive layer and a second resin layer.

11. The laminated glass according to claim 1, wherein a maximum dimension of the functional member area is at least 300 mm and at most 3,000 mm.

12. A laminated glass, comprising:
a first glass substrate;
a second glass substrate laminated to the first substrate;
a first interleaver disposed between the first glass substrate and the second glass substrate and being in contact with the first glass substrate;
a second interlayer disposed between the first glass substrate and the second glass substrate and being in contact with the second glass substrate; and
first and second functional members disposed between the first and second interlayers and being in contact with the first and second interlayers,
wherein the first and second functional members have a higher rigidity than the first and second interlayers and are spaced apart from each other forming a gap by a distance d of at least 15 mm, the second glass substrate has a first surface A in contact with the second interlayer, a second surface A not in contact with the second interlayer, the first glass substrate has a first surface B in contact with the first interlayer, and a second surface B not in contact with the first interlayer, the second glass substrate a first functional member area that overlaps the first functional member and a longitudinal cross-section in which a radius of curvature of the second surface A of the second glass substrate becomes the smallest among cross-sections containing the normal at the center of gravity, and when viewed from a normal direction, the longitudinal cross-section extends in a first direction, a second direction is orthogonal to the first direction and formula (2) holds $$\left(\frac{Dx}{Lx0} \times 100\right) \times \left(\frac{Dy}{Ly0} \times 100\right) < 5.5 \qquad \text{Formula (2)}$$

where Dx is a maximum bending depth in the first direction of the first glass substrate in the first functional member area in mm, Dy is a maximum bending depth in the second direction of the first glass substrate in the first functional member area in mm, Lx0 is a maximum length of the first functional member area in the first direction along the second surface B in mm, and Ly0 is a maximum length of the first functional member area in the second direction along the second surface B in mm.

13. The laminated glass according to claim 12, wherein the second glass substrate a second functional member area that overlaps the second functional member, and the formula (2) is valid for the second functional member area in mm, and Dx is a maximum bending depth in the first direction of the first glass substrate in the first functional member area or the second functional member area in mm, and Dy is a maximum bending depth in the second direction of the first glass substrate in the first functional member area or the second functional member area in mm, Lx0 is a maximum length of the first functional member area or the second functional member area in the first direction along the second surface B in mm, and Ly0 is a maximum length of the first functional member area or the second functional member area in the second direction along the second surface B in mm.

14. The laminated glass according to claim 1, wherein a total area of air bubbles in the gap between the first and second functional members is less than 5 mm².

15. The laminated glass according to claim 12, wherein the distance d is at least 20 mm.

16. The laminated glass according to claim 12, wherein the first and second interlayers are in direct contact with each other in the gap between the first and second functional members.

17. The laminated glass according to claim 12, wherein the first and/or second functional member has a resin layer, and the resin layer comprises at least one selected from the group consisting of polyethylene terephthalate, polyethylene naphthalate, polyamide, polyether, polysulfone, polyether sulfone, polycarbonate, polystyrene, cyclic polyolefin, polyarylate, polyetherimide, polyether ether ketone, polyimide, aramid, polybutylene terephthalate, triacetyl cellulose, polyurethane, and cyclo-olefin polymer.

18. A laminated glass, comprising:
a first glass substrate;
a second glass substrate laminated to the first substrate;
a first interlayer disposed between the first glass substrate and the second glass substrate and being in contact with the first glass substrate;

a second interlayer disposed between the first glass substrate and the second glass substrate and being in contact with the second glass substrate; and first and second functional members disposed between the first and second interlayers and being in contact with the first and second interlayers, wherein the first and second functional members each have a film form and have a higher rigidity than the first and second interlayers, and the first and second functional members are spaced apart from each other forming a gap by a distance d of at least 15 mm.

19. The laminated glass according to claim 18, wherein the first and second functional members are each a light control film.

20. The laminated glass according to claim 19, wherein each light control film comprises, in order of proximity from the first glass substrate, a first resin layer, a first conductive layer, a light control element, a second conductive layer and a second resin layer.

* * * * *